(12) United States Patent
Wu

(10) Patent No.: US 6,220,298 B1
(45) Date of Patent: Apr. 24, 2001

(54) FAUCET HAVING A FILTER MEMBER RECEIVED THEREIN

(76) Inventor: Mu Lin Wu, No. 320, Hsiao T Road, Her Mei Chen, Chang Hua Hsien (TW)

(*) Notice: Subject to any disclaimer, the term of this patent is extended or adjusted under 35 U.S.C. 154(b) by 0 days.

(21) Appl. No.: 09/411,726

(22) Filed: Oct. 1, 1999

(30) Foreign Application Priority Data

Mar. 23, 1999 (TW) .................................................. 88204398
Mar. 23, 1999 (TW) .................................................. 88204399

(51) Int. Cl.⁷ ....................................................... E03C 1/04
(52) U.S. Cl. ............................................ 137/801; 210/424
(58) Field of Search ............................. 137/801; 210/424

(56) References Cited

U.S. PATENT DOCUMENTS

| 93,561 | * | 8/1869 | Sauter | ............................... | 137/625.41 |
| 570,246 | * | 10/1896 | Boluss | ................................... | 251/310 |
| 4,221,335 | * | 9/1980 | Shames et al. | .................... | 239/428.5 |
| 5,744,033 | * | 4/1998 | Bertrand et al. | .............. | 137/625.5 X |

\* cited by examiner

*Primary Examiner*—Gerald A. Michalsky
(74) *Attorney, Agent, or Firm*—Charles E. Baxley, Esq.

(57) ABSTRACT

A faucet includes a tubular body having an open end with a filter member received in the tubular body and the filter member has an outlet defined through one of two ends thereof. The tubular body has a head member connected to the open end thereof and the tubular body has an engaging tube which is connected to the outlet of the filter member. The head has a separating plate through which two apertures are defined and the engaging tube communicates one of the apertures. A valve device is pivotably received in the head member and has a first hole and a second hole defined through therein which alternately communicate with the two holes of the head member by operating the valve device so that the water filtered by the filter member flows from the first hole and the water not filtered flows from the second hole.

7 Claims, 9 Drawing Sheets

FAUCET HAVING A FILTER MEMBER RECEIVED THEREIN

FIELD OF THE INVENTION

The present invention relates to a faucet having a filter member received therein, a valve means received in the faucet and having two holes which respectively communicate with the filter member and the space between the filter member and the inside of the faucet.

BACKGROUND OF THE INVENTION

A conventional water filtering device generally is connected to the faucet externally. The filtering device occupies a space and located beside the faucet so that the house keeper always takes a lot of time to make a decision to put the filtering device on the counter or not. Some filter device is directly connected to the outlet of the faucet to filter water flowing from the faucet. However, the filter device connected to the outlet of the faucet will filter all the water flowing from the faucet and this will make the term of use of the filter device be shortened. A perfect filter device filters the water that is to be drunk and the water that is used to wash trays is not necessary to be filtered.

The present invention intends to provide a faucet having a filter member received therein and a valve means is connected to the faucet and controls the water to be drunk to flow through the filter member. By using the faucet having the filter member, the edible water is filtered by the filter member and the water that is not to be drunk flows from the faucet without passing through the filter member. Therefore, the shortcomings of the conventional faucet with the filter device are overcome.

SUMMARY OF THE INVENTION

In accordance with one aspect of the present invention, a faucet is provided and comprises a tubular body having an open end and a filter member received in the tubular body. The filter member has an outlet defined through one of two ends thereof. A head member has a first section connected to the open end and a second section, wherein a separating plate is connected between the first section and the second section. A first aperture and a second aperture are respectively defined through the separating plate. An engaging tube engaged between the outlet of the filter member and the separating plate. The engaging tube communicates with the first hole. A valve means is pivotably received in the second section and has a first hole and a second hole. Filtered water is obtained when the first hole communicates with the first aperture, and pipe water is obtained when the second hole communicates with the second aperture.

The main object of the present invention is to provide a faucet having a filter member received therein and a valve means is connected to a head member connected to the faucet so that the filtered water and the pipe water are obtained in separate from the end member.

Further objects, advantages, and features of the present invention will become apparent from the following detailed description with appropriate reference to the accompanying drawings.

DETAILED DESCRIPTION OF THE PREFERRED EMBODIMENTS

Figure 1:
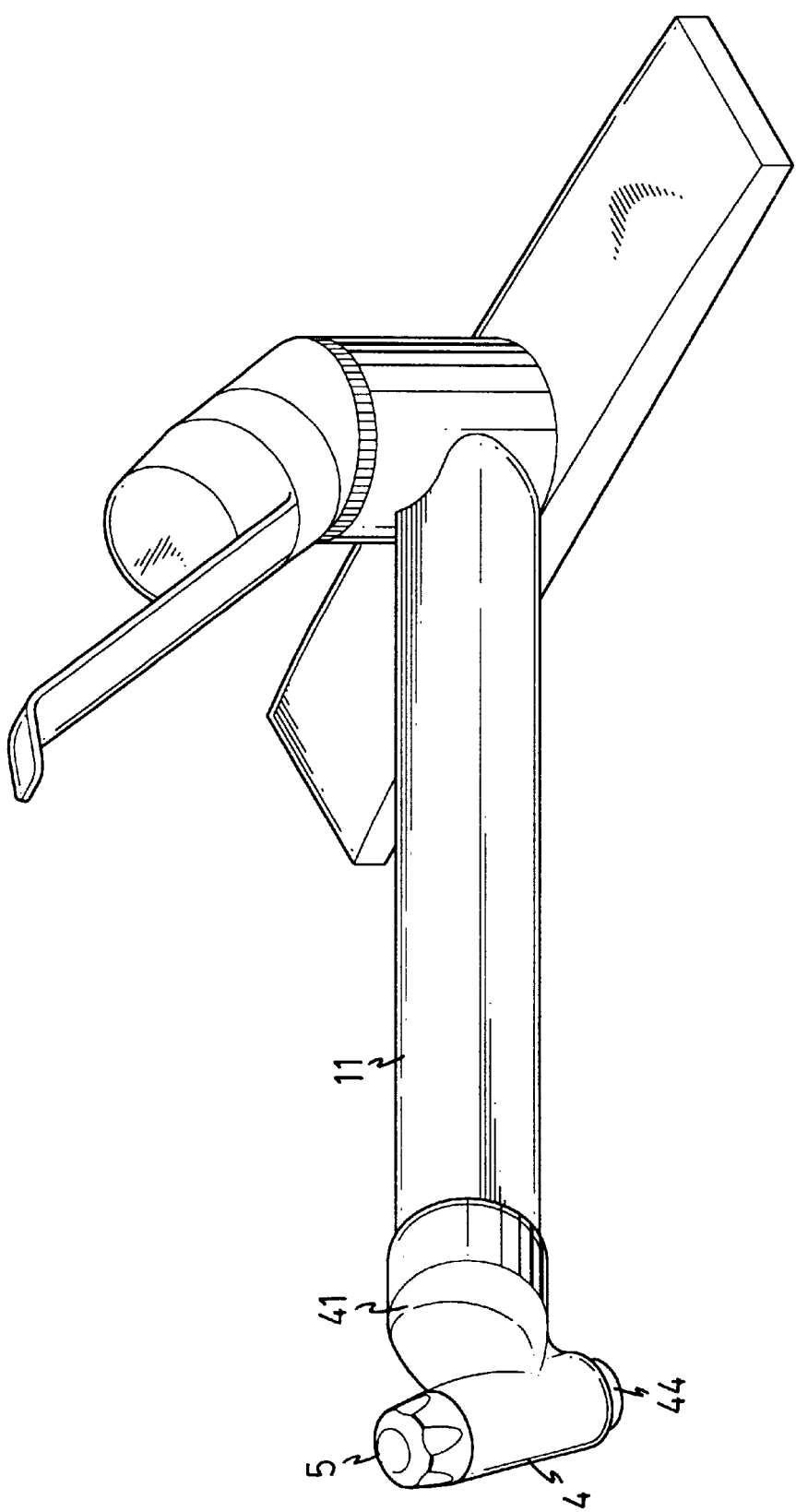
FIG. 1 is a perspective view of the faucet with a filter member received therein in accordance with the present invention.
Figure 2:
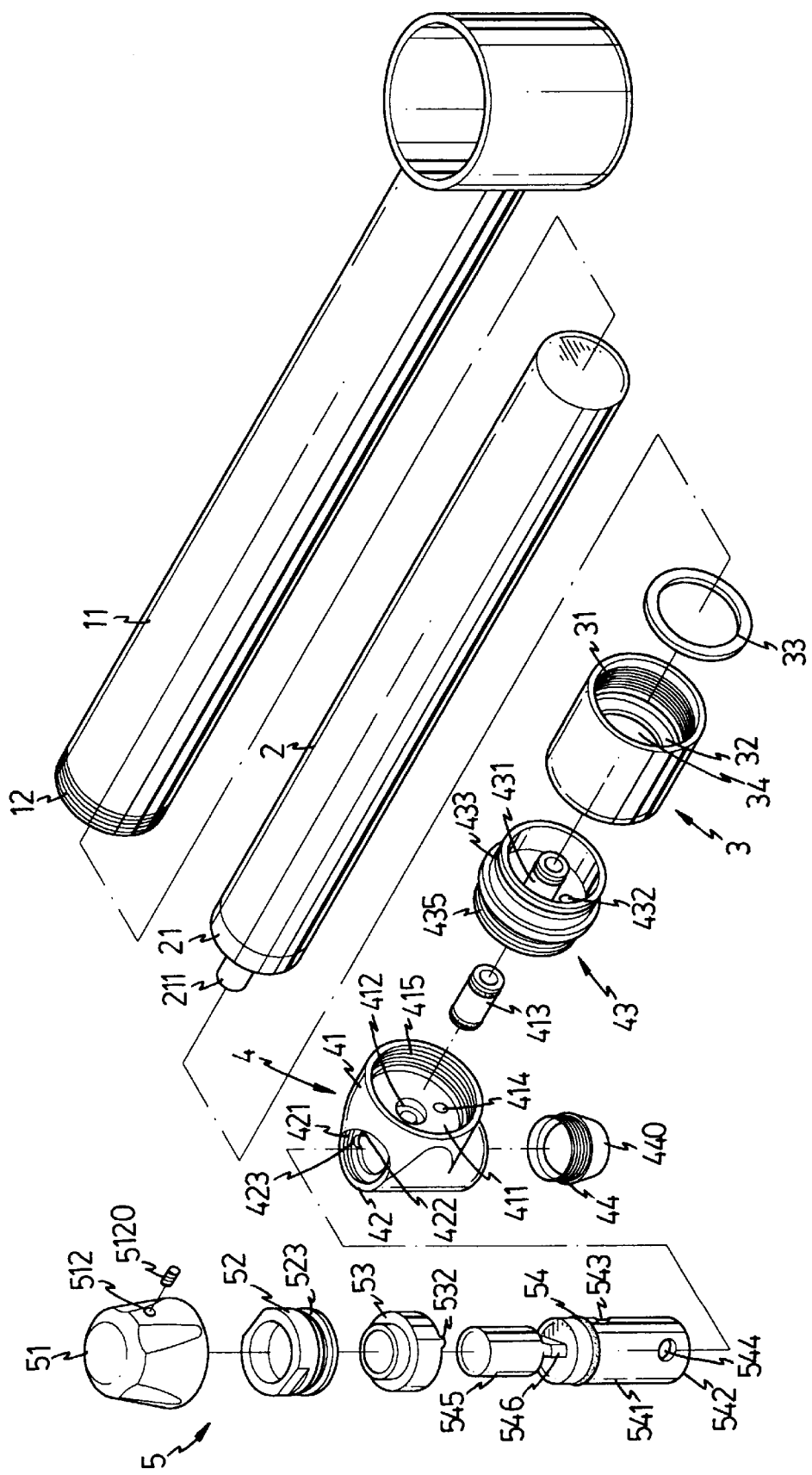
FIG. 2 is an exploded view of the faucet, the filter member and a valve means in accordance with the present invention.
Figure 3:
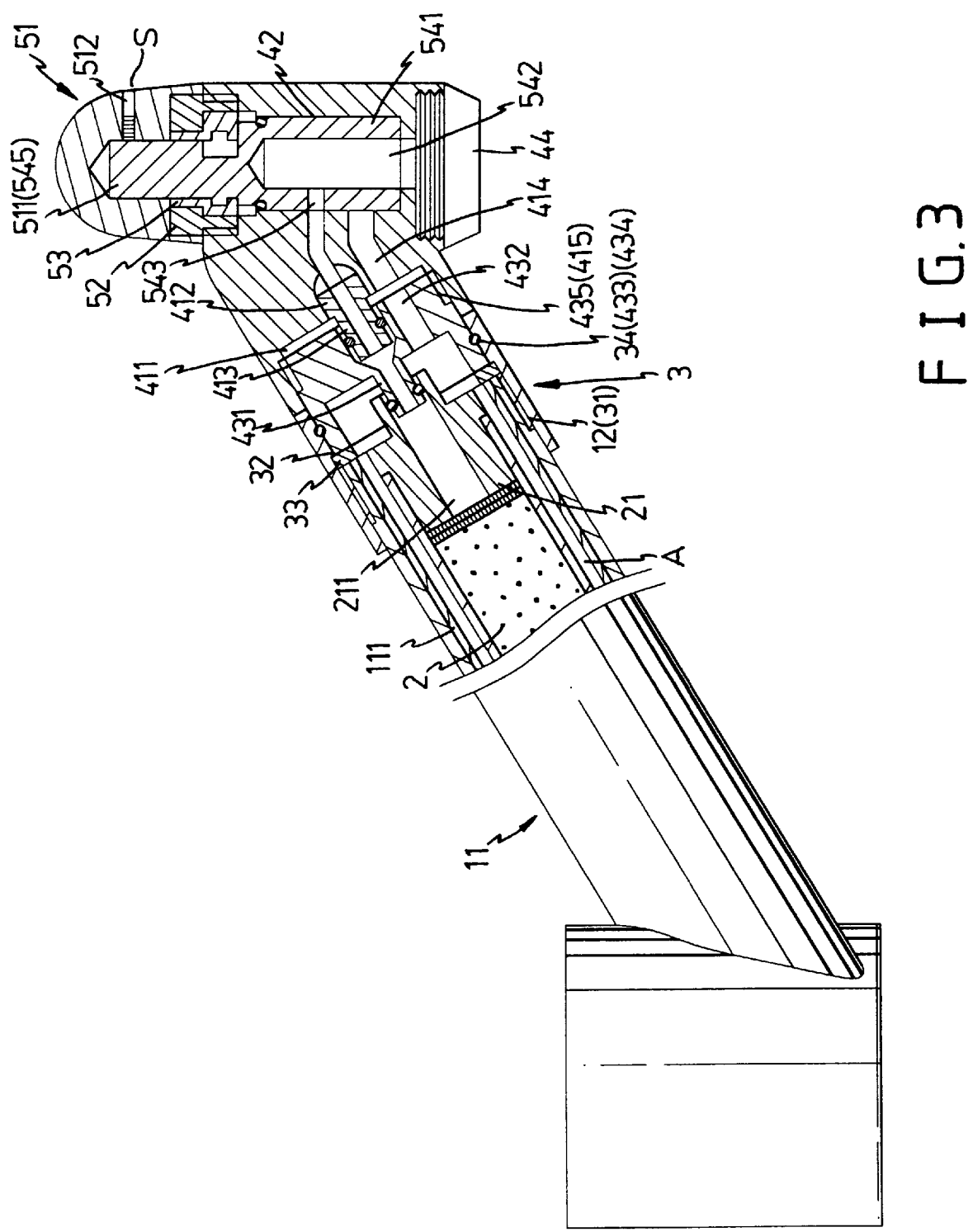
FIG. 3 is a side elevational view, partly in section, of the faucet in accordance with the present invention.

Referring to FIGS. 1 to 3, the faucet of the present invention comprises a tubular body 11 having an open end which has a threaded section 12. A filter member 2 is received in the tubular body 11 and has a cover 21 connected to one of two ends thereof, the cover 21 having an outlet 211 defined therethrough.

A head member 4 has a first section 41 and a second section 42 which is connected to the first section 41 with an included angle defined therebetween. An end member 44 is connected to the second section 42 and has a tapered skirt portion 440 on a distal end thereof. The first section 41 is connected to the threaded section 12 of the open end and a separating plate 411 connected between the first section 41 and the second section 42. A first aperture 412 and a second aperture 414 respectively defined through the separating plate 411. A connector 43 which has two threaded ends 433, 435 and one of which is connected to an inner threaded periphery 415 of the first section 41 of the head member 4, and the other threaded ends 433 is threadedly connected to a sleeve 3 which has an inner threaded periphery 31 so as to be connected to the threaded section of the threaded section 12 of the tubular body 11. The connector 43 has a intermediate plate from which an engaging tube 431 extends and a hole 432 defined through the intermediate plate. A connection tube 413 connected and communicating the engaging tube 431 and the first aperture 412, and the hole 432 communicating with the second aperture 414. An annular flange 32 extends radially inward from the inside of the sleeve 3 and a groove 34 defined in the inside of the sleeve 3 so that a seal 33 is engaged with the groove 34.

A valve means 5 is pivotably received in the second section 42 and has a rotator 54 pivotably received in the second section 42 of the head member 4. The rotator 54 includes a first section 545 and a second section 541 which has a first hole 543 and a second hole 544 defined therethrough. The second section 541 has an open bottom 542. A thumb 546 extends radially outward from the first section 545. A first ring 52 and a second ring 53 are respectively mounted to the first section 545, the first ring 52 is threadedly engaged with the threaded inside 421 in the second section 42 and the second ring 53 has two teeth 532. The two teeth 532 are engaged with two notches 423 defined in the inside of the second section 42 of the head member 4. The first section 545 of the rotator 54 is connected to a switch knob 51 so that the rotator 54 is rotated by operating the switch knob 51. The switch knob 5 1 has a passage 512 defined therethrough and a bolt 5120 extends through the passage 512 and contacts against the first section 545 of the rotator 54.

Figure 4:
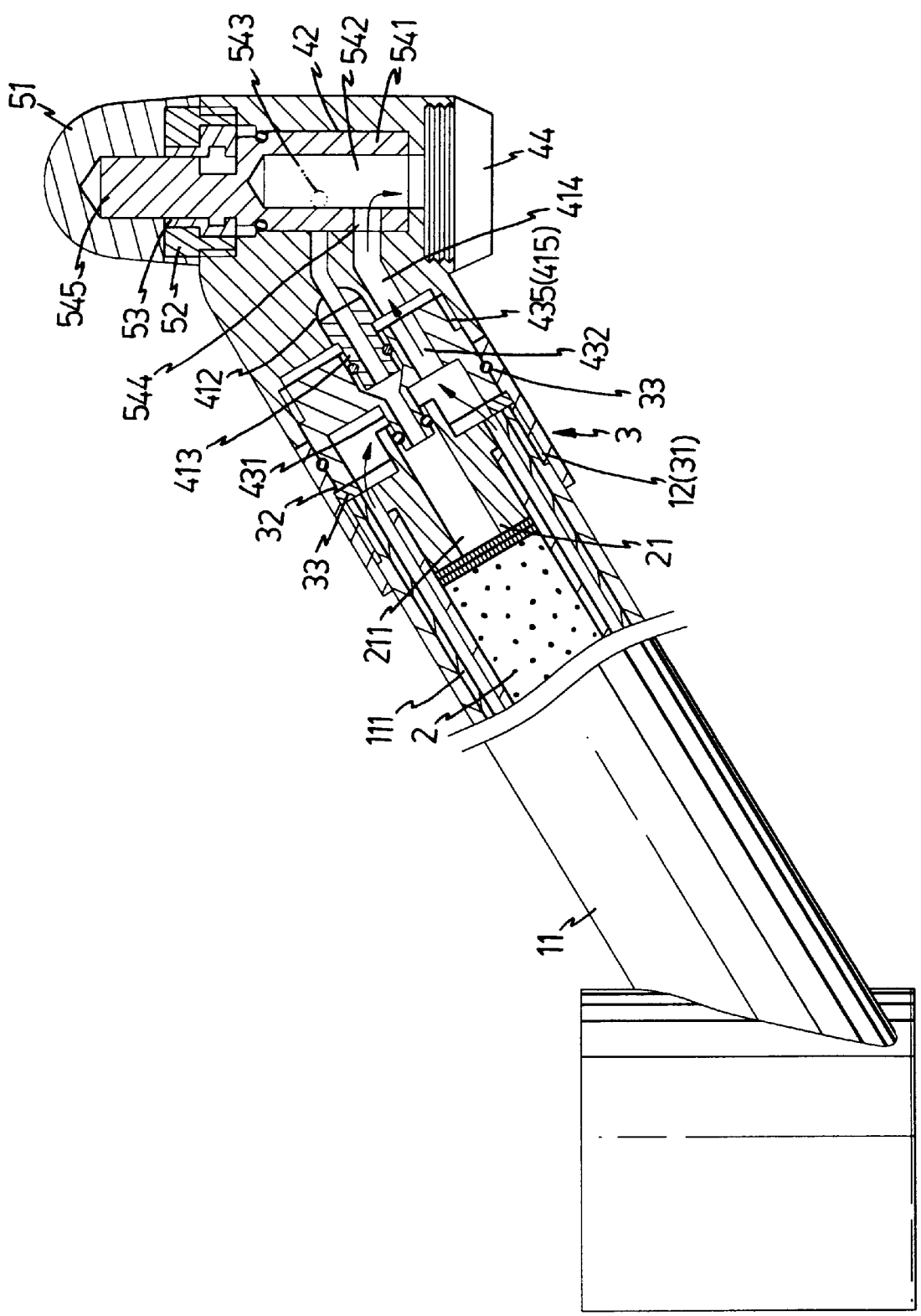
FIG. 4 is a side elevational view, partly in section, of the faucet in accordance with the present invention, wherein the valve means is operated to obtain the pipe water from the head member.

Referring to FIG. 4, when rotating the switch knob 51 to the pipe water position, the rotator 54 is rotated and the second hole 544 communicates with the second aperture 414, so that pipe water in the annular chamber between the filter member 2 and the inside 111 of the tubular body 11 flows from the end member 44 via the second aperture 414.

Figure 5:
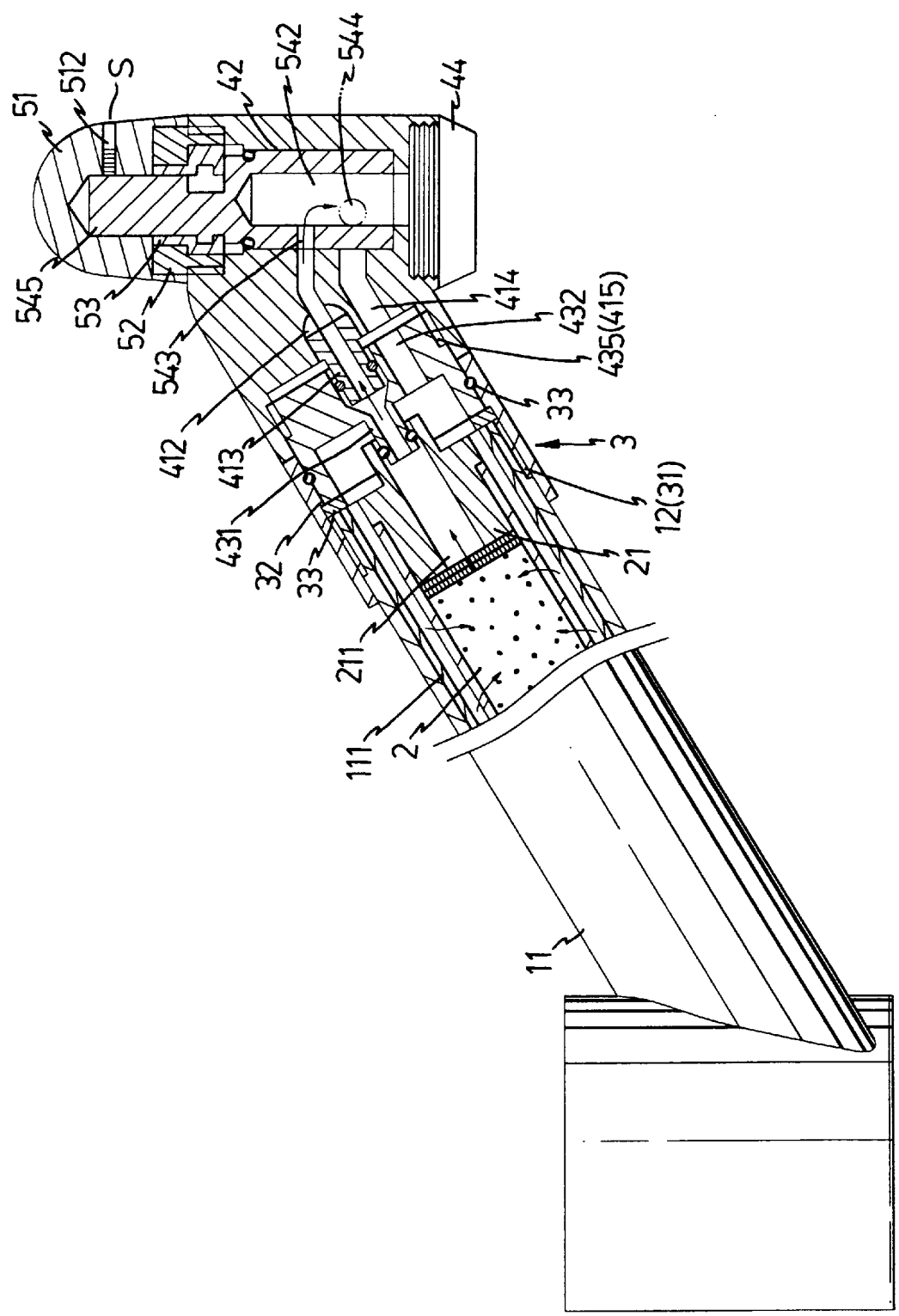
FIG. 5 is a side elevational view, partly in section, of the faucet in accordance with the present invention, wherein the valve means is operated to obtain the filtered water from the head member.

Referring to FIG. 5, when rotating the switch knob 51 to the filter water position, the rotator 54 is rotated and the first hole 543 communicates with the first aperture 412, so that the water passing through the filter member 2 flows from the end member 44 via the first aperture 412. The skirt portion 440 of the end member 44 limits the flow of water not spread or splash.

Figure 6:
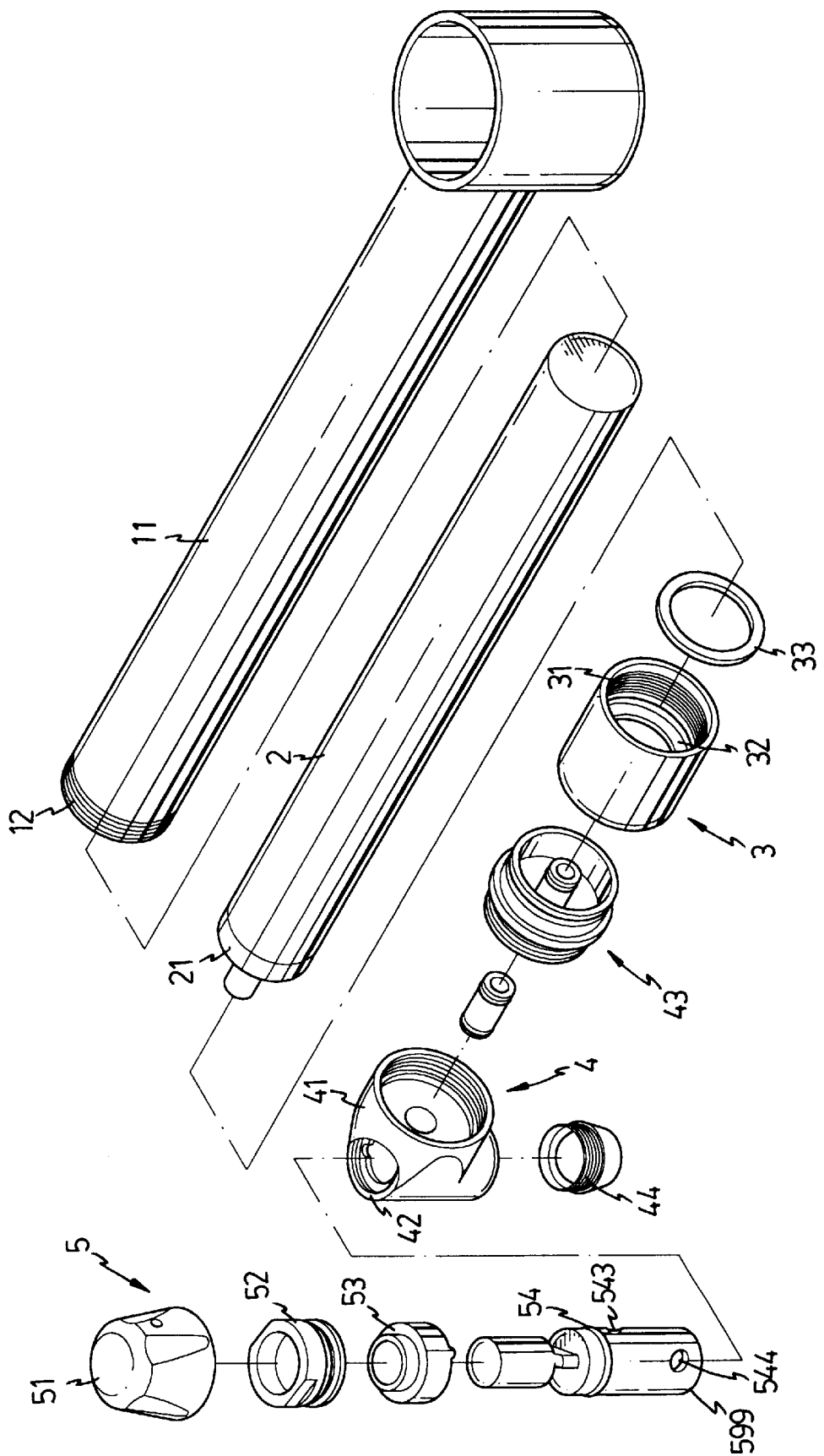
FIG. 6 is an exploded view of another embodiment of the faucet, the filter member and a valve means in accordance with the present invention.

Referring to FIG. 6, each of the first hole 543 and the second hole 544 may have a respective seal 599 engaged therewith so as to obtain a better sealing function.

Accordingly, the faucet of the present invention let the edible water pass through the filter member 2 by operating the switch knob 51 so that the term of use of the filter member 2 can be maintained even longer.

Figure 7:
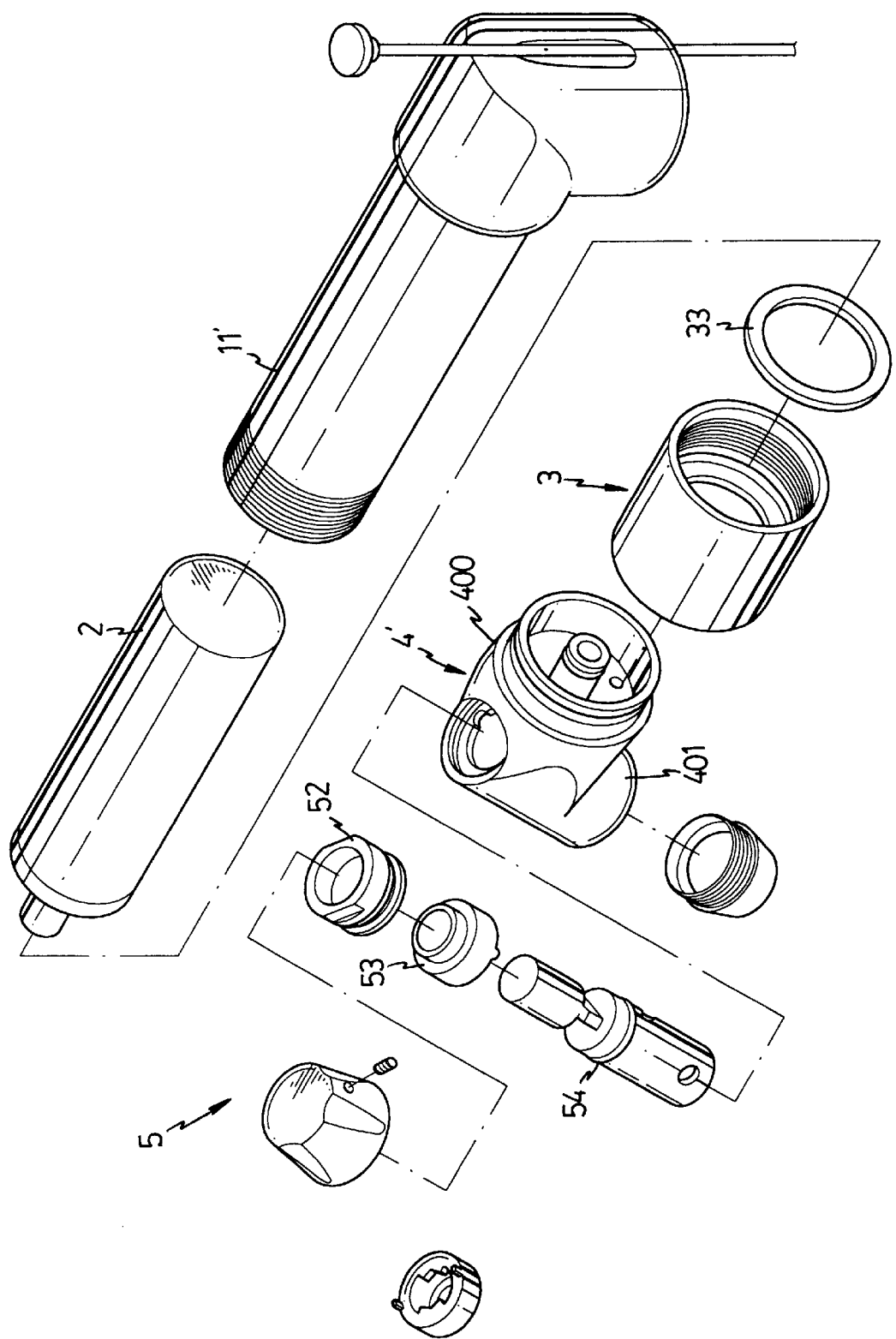
FIG. 7 is an exploded view of another embodiment of the faucet, the filter member and a valve means in accordance with the present invention.
Figure 8:
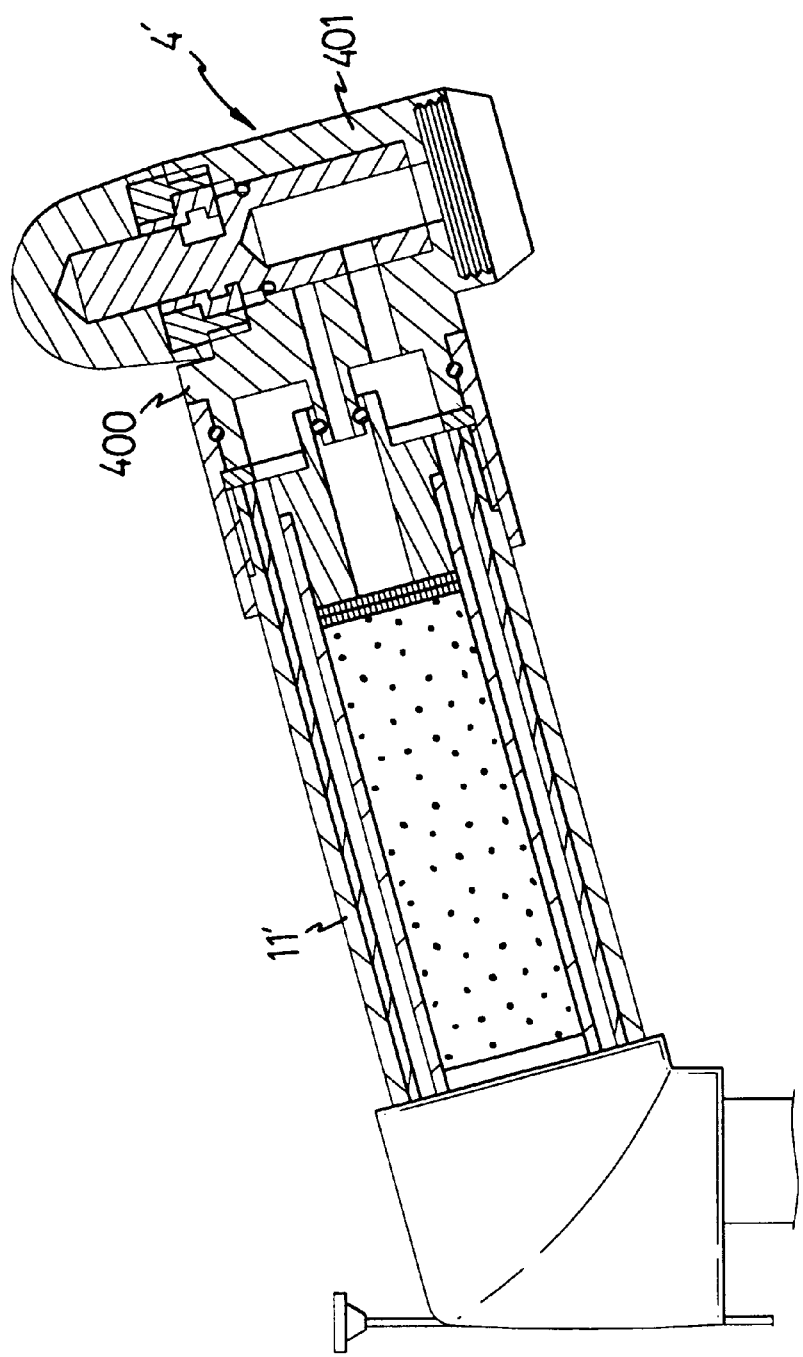
FIG. 8 is a side elevational view, partly in section, of another embodiment of the faucet in accordance with the present invention, wherein the head member and the connector is a one-piece member and the direction of the water is perpendicular to the tubular body.

Referring to FIGS. 7 and 8, the direction of the water flowing from the head member 4' can be perpendicular to the tubular body 11'. The embodiment of the faucet is similar to that of the faucet shown in FIG. 2, only the head member 4 and the connector 43 in FIG. 2 become a one-piece member. The head member 4' includes a first tubular end 400 which is connected to the tubular body 11' and a second tubular end 401 which is connected to the first tubular end 400 perpendicularly. Therefore, the water will flow via the second tubular end 401 and is perpendicular to the tubular body 11'.

Figure 9:
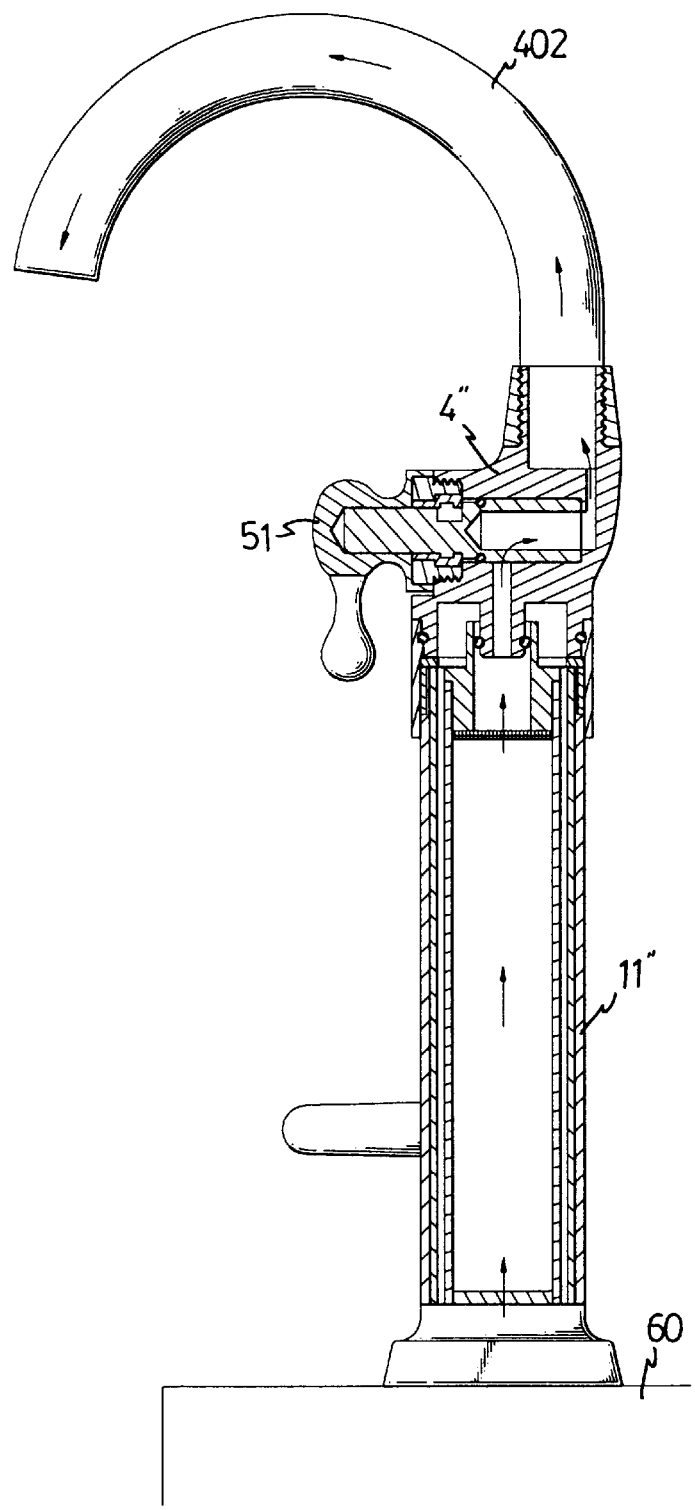
FIG. 9 is a side elevational view, partly in section, of yet another embodiment of the faucet in accordance with the present invention, wherein faucet extends upright from the counter and has a curved tube.

FIG. 9 shows yet another embodiment of the faucet of the present invention wherein the tubular body 11" extends upright from the counter 60. The head member 4" is further connected to a curved tube 402 so that the faucet will not occupy space in horizontal direction and the curved tube 402 guides the water to flow upright and flow from the outlet of the curved tube 402.

The invention is not limited to the above embodiment but various modification thereof may be made. It will be understood by those skilled in the art that various changes in form and detail may made without departing from the scope and spirit of the present invention.

What is claimed is:

1. A faucet comprising:
   a tubular body having an open end, a filter member received in said tubular body and the filter member having an outlet defined through one of two ends thereof;
   a head member having a first section and a second section, said first section connected to said open end and a separating plate connected between said first section and said second section, a first aperture and a second aperture respectively defined through said separating plate, an engaging tube engaged between said outlet of said filter member and said separating plate, said engaging tube communicating with said first aperature, and
   a valve means pivotably received in said second section and having a first hole and a second hole.

2. The faucet as claimed in claim 1 further comprising an end member connected to said second section and said end member having a tapered skirt portion on a distal end thereof.

3. The faucet as claimed in claim 1 further comprising a connector which has one end connected to said first section of said head member, a sleeve connected between said open end of said tubular body and the other end of said connector.

4. The faucet as claimed in claim 1, wherein said valve means has a rotator pivotably received in said second section of said head member, said rotator having said first hole and said second hole defined therethrough.

5. The faucet as claimed in claim 4, wherein said rotator is connected to a switch knob so that said rotator is rotated by operating said switch knob.

6. The faucet as claimed in claim 5, wherein said switch knob has a passage defined therethrough and a bolt extends through said passage and contacts against said rotator.

7. The faucet as claimed in claim 5, wherein said rotator includes a first section and a second section which has a first hole and a second hole defined therethrough, said first section of said rotator connected to said switch knob, said first hole and said second hole respectively communicating with said first aperture and said second aperture in said separating plate when rotating said rotator, a first ring and a second ring respectively mounted to said first section of said rotator, said first ring connected to said second section of said head member and said second ring having two teeth, two notches defined in an inside of said second section of said head member and engaged with said two teeth.

* * * * *